United States Patent
Ding

(10) Patent No.: US 9,914,291 B2
(45) Date of Patent: Mar. 13, 2018

(54) FORMING DEVICE FOR THREE-DIMENSIONAL PRINTING MACHINE, AND A THREE-DIMENSIONAL PRINTING MACHINE

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventor: Ming-Hsiung Ding, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 464 days.

(21) Appl. No.: 14/660,026

(22) Filed: Mar. 17, 2015

(65) Prior Publication Data
US 2015/0328841 A1    Nov. 19, 2015

(30) Foreign Application Priority Data
May 16, 2014  (TW) .............................. 103117323 A

(51) Int. Cl.
*B29C 64/135*    (2017.01)
*B33Y 30/00*    (2015.01)
(Continued)

(52) U.S. Cl.
CPC ............ *B33Y 30/00* (2014.12); *B29C 64/135* (2017.08); *B29C 64/20* (2017.08); *B33Y 10/00* (2014.12); *B29L 2009/00* (2013.01)

(58) Field of Classification Search
CPC ............ B29C 67/0066; B29C 67/0085; B29C 67/0092; B29C 64/135; B29C 64/20
(Continued)

(56) References Cited

U.S. PATENT DOCUMENTS 3,662,567 A * 5/1972 Condon ................. F16D 1/076
                                                         403/336
5,248,456 A * 9/1993 Evans, Jr. ........... B29C 67/0066
                                                         118/423
(Continued)

FOREIGN PATENT DOCUMENTS

| CN | 202507221 U | 10/2012 |
| CN | 103144306 A | 6/2013 |
| GB | 1105725 A | 3/1968 |

OTHER PUBLICATIONS

Chinese Search Report dated Dec. 26, 2016 for Appln. No. 201410279801.6.

*Primary Examiner* — Alison L Hindenlang
*Assistant Examiner* — Emmanuel S Luk
(74) *Attorney, Agent, or Firm* — Pillsbury Winthrop Shaw Pittman, LLP

(57) ABSTRACT

A forming device for a three-dimensional printing machine is connected to a height adjusting mechanism of the three-dimensional printing machine, and is driven by the height adjusting mechanism to move vertically. The forming device includes an universal joint, a forming platform, a coupling shaft interconnecting the universal joint and the forming platform, and a clamping mechanism. The clamping mechanism includes a clamping arm adapted to interconnect the height adjusting mechanism and the universal joint, and having first and second arm portions movable relative to each other between a locking state to tightly clamp the (Continued)

universal joint, and a releasing state to release the universal joint so that the forming platform is movable relative to the clamping mechanism.

4 Claims, 5 Drawing Sheets

(51) Int. Cl.
  *B33Y 10/00* (2015.01)
  *B29C 64/20* (2017.01)
  *B29L 9/00* (2006.01)
(58) Field of Classification Search
  USPC .......................................................... 425/182
  See application file for complete search history.

(56) References Cited

U.S. PATENT DOCUMENTS

| | | | | |
|---|---|---|---|---|
| 9,346,217 B2* | 5/2016 | Huang | ................ | B29C 67/0062 |
| 9,561,624 B1* | 2/2017 | Wu | .................... | B29C 67/0066 |
| 2004/0004303 A1* | 1/2004 | Iskra | ..................... | B22F 3/1055 |
| | | | | 264/109 |
| 2007/0075461 A1* | 4/2007 | Hunter | ................... | B29B 13/02 |
| | | | | 264/401 |
| 2010/0247703 A1* | 9/2010 | Shi | ...................... | B29C 67/0081 |
| | | | | 425/375 |
| 2012/0043312 A1* | 2/2012 | Lee | ........................ | H05B 6/062 |
| | | | | 219/622 |
| 2013/0052292 A1* | 2/2013 | Busato | ................ | B29C 67/0066 |
| | | | | 425/174.4 |
| 2014/0114359 A1* | 4/2014 | Hawkes | ............. | A61B 17/7049 |
| | | | | 606/279 |
| 2014/0265034 A1* | 9/2014 | Dudley | ............... | B29C 67/0085 |
| | | | | 264/401 |
| 2015/0044318 A1* | 2/2015 | Ohkusa | ............... | B29C 67/0085 |
| | | | | 425/174.4 |
| 2015/0064298 A1* | 3/2015 | Syao | ................... | B29C 67/0062 |
| | | | | 425/169 |
| 2015/0151489 A1* | 6/2015 | Elsey | .................. | B29C 67/0062 |
| | | | | 264/401 |
| 2015/0240865 A1* | 8/2015 | Walter | ............... | F16C 11/0623 |
| | | | | 403/134 |

* cited by examiner

FORMING DEVICE FOR THREE-DIMENSIONAL PRINTING MACHINE, AND A THREE-DIMENSIONAL PRINTING MACHINE

CROSS-REFERENCE TO RELATED APPLICATION

This application claims priority of Taiwanese Application No. 103117323, filed on May 16, 2014.

FIELD OF THE INVENTION

The invention relates to a forming device, more particularly to a forming device for a three-dimensional printing machine, and a three-dimensional printing machine having the forming device.

BACKGROUND OF THE INVENTION

Stereolithography is a widely adopted technique in modern three-dimensional printing technologies. A printer utilizing stereolithography technique includes a container, a laser, a scanner, and a forming mechanism with a forming platform. A light-curable liquid is contained in the container. The laser is located at a position lower than the container and emits laser beams toward the scanner. The scanner is located underneath the container and reflects the laser beams toward a base wall of the container in order to cure the light-curable liquid. The forming platform is vertically movable relative to the base wall of the container for extending into the container and pulling the product of the cured light-curable liquid away from the container.

In order to form a product with precise shape and dimensions, it is necessary to precisely control the relative position between the forming platform and the container. Also, it is important to maintain stability of the forming platform during vertical movement relative to the container.

SUMMARY OF THE INVENTION

Therefore, one aspect of this invention is to provide a forming device adapted for use in a three-dimensional printing machine with a height adjusting mechanism.

According to one type of the present invention, the forming device is connected to the height adjusting mechanism and driven by the height adjusting mechanism to move vertically. The forming device includes an universal joint, a forming platform, a coupling shaft, and a clamping mechanism. The coupling shaft has opposite ends that are connected respectively to the universal joint and the forming platform. The clamping mechanism includes a clamping arm that is adapted to interconnect the height adjusting mechanism and the universal joint, and that has first and second arm portions. The first and second arm portions are movable relative to each other between a locking state to tightly clamp the universal joint therebetween, and a releasing state to release the universal joint. When the first and second arm portions are at the releasing state, the forming platform is movable relative to the clamping mechanism.

Another aspect of this invention is to provide a three-dimensional printing machine having the forming device of this invention.

According to another type of the present invention, the three-dimensional printing machine includes a base, a container, a height adjusting mechanism, a forming device, a laser, and a scanner. The container is mounted on the base for containing a light-curable liquid therein. The height adjusting mechanism is connected to a lateral end of the base. The forming device is connected to the height adjusting mechanism and is driven by the height adjusting mechanism to move vertically relative to the container. The forming device includes a forming mechanism and a clamping mechanism. The forming mechanism includes an universal joint, a forming platform disposed under the universal joint, and a coupling shaft having opposite ends that are connected respectively to the universal joint and the forming platform. The clamping mechanism includes a clamping arm that interconnects the height adjusting mechanism and the universal joint. The clamping arm is operable to tightly clamp or to release the universal joint. When the universal joint is released from the clamping arm, the forming platform is movable relative to the clamping mechanism. The laser is adapted for producing laser beams. The scanner reflects the laser beams produced by the laser to the light-curable liquid.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
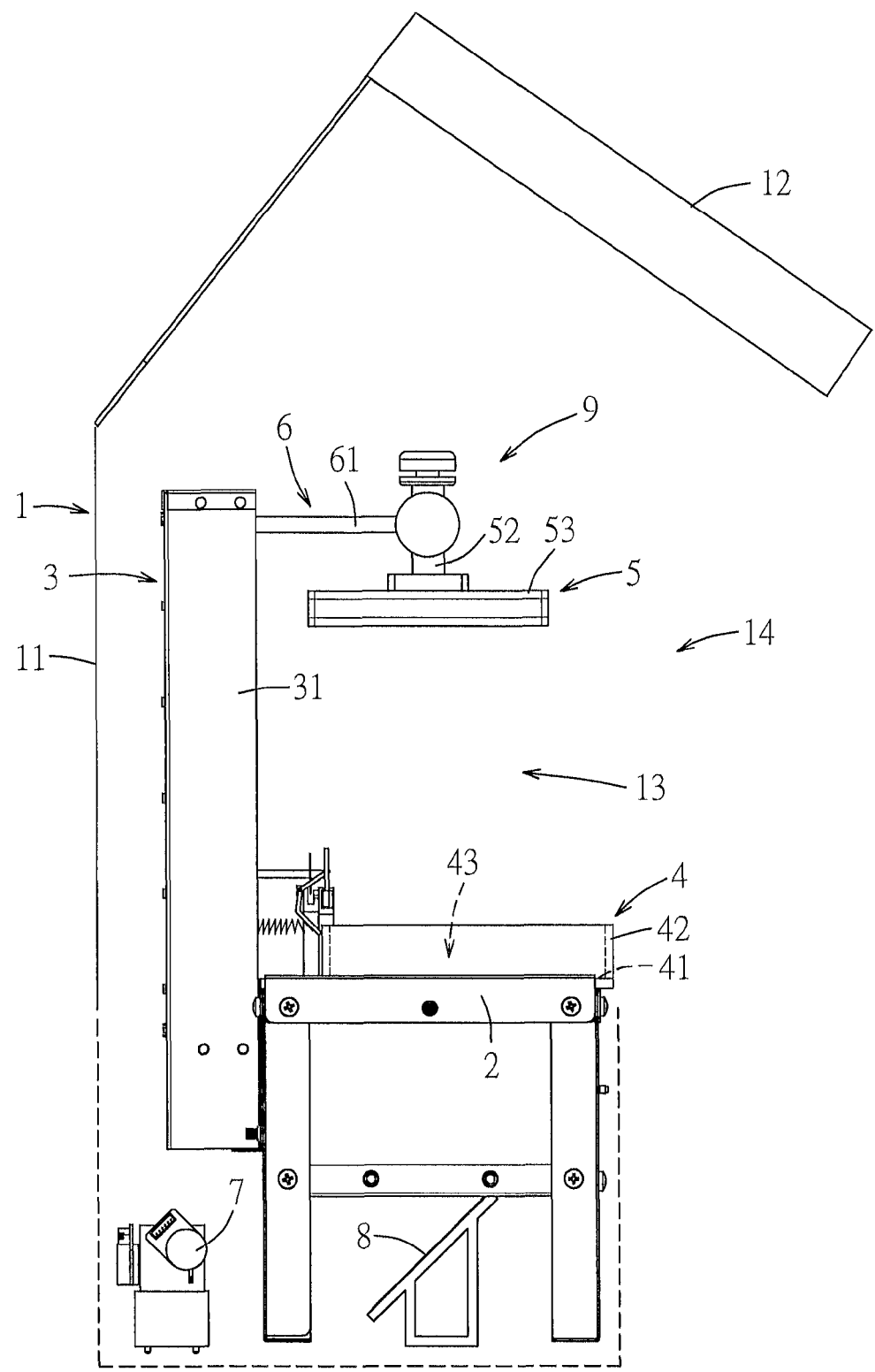
FIG. 1 is a side view of a first embodiment of a three-dimensional printing machine according to the present invention, illustrating a cover member at an opening state.

Before the present invention is described in greater detail with reference to the accompanying embodiments, it should be noted herein that like elements are denoted by the same reference numerals throughout the disclosure.

Figure 2:
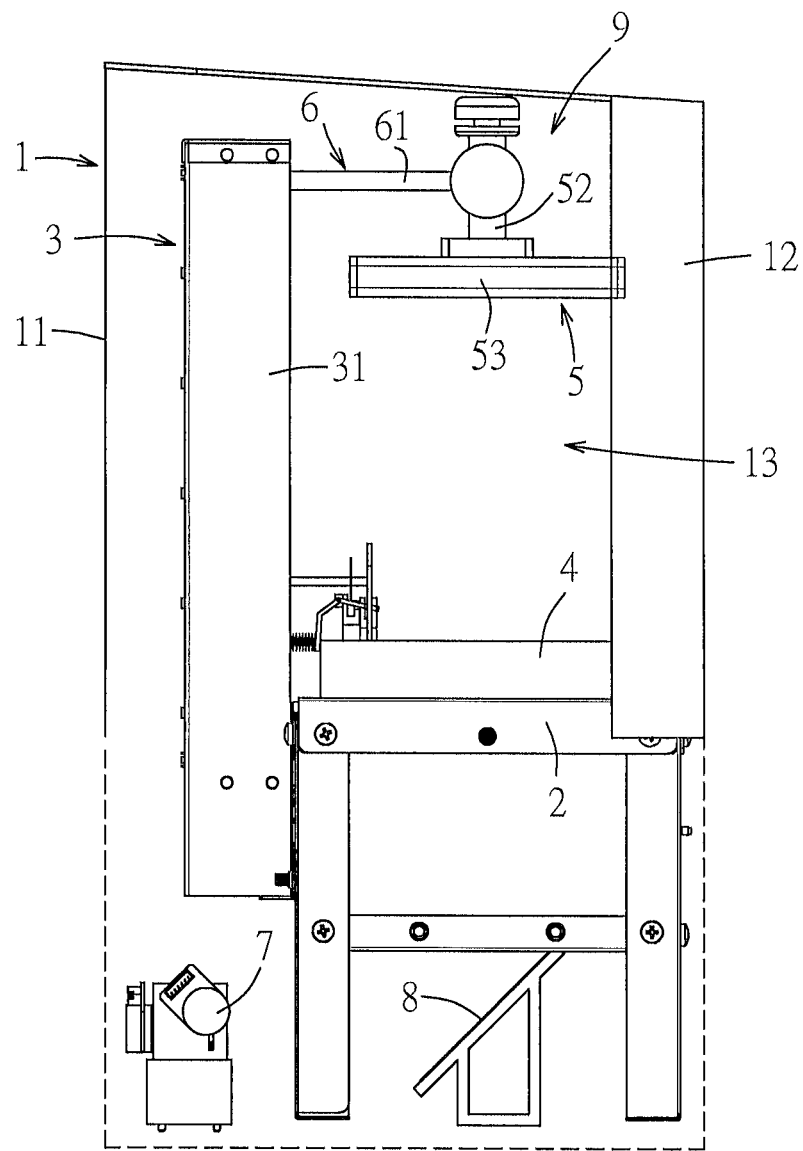
FIG. 2 is a side view of the first embodiment with the cover member at a closing state.

FIGS. 1 and 2 illustrate a first embodiment of a three-dimensional printing machine according to the present invention that includes a housing 1, a base 2, a height adjusting mechanism 3, a container 4, a laser 7, a scanner 8, and a forming device 9. The forming device 9 has a forming mechanism 5 and a clamping mechanism 6. The housing 1 includes a housing body 11 formed with an opening 14, and a cover member 12 connected to the housing body 11 and openably covering the opening 14. The housing body 11 defines a receiving space 13 for receiving the base 2, the height adjusting mechanism 3, the container 4, the laser 7, the scanner 8, and the forming device 9 therein. The cover member 12 is movable between an opening state (see FIG. 1), and a closing state (see FIG. 2) that covers up the opening 14. The container 4 is mounted on the base 2 for retaining a light-curable liquid (not shown) therein. When the cover member 12 is at the opening state, the container 4 can be taken out from the receiving space 13 to be cleaned or be replenished with the light-curable liquid.

The container 4 includes a light-transmissive base 41, and a surrounding wall 42 vertically extending from the base 41. The base 41 and the surrounding wall 42 cooperatively define a containing space 43 for containing the light-curable liquid therein.

Figure 3:
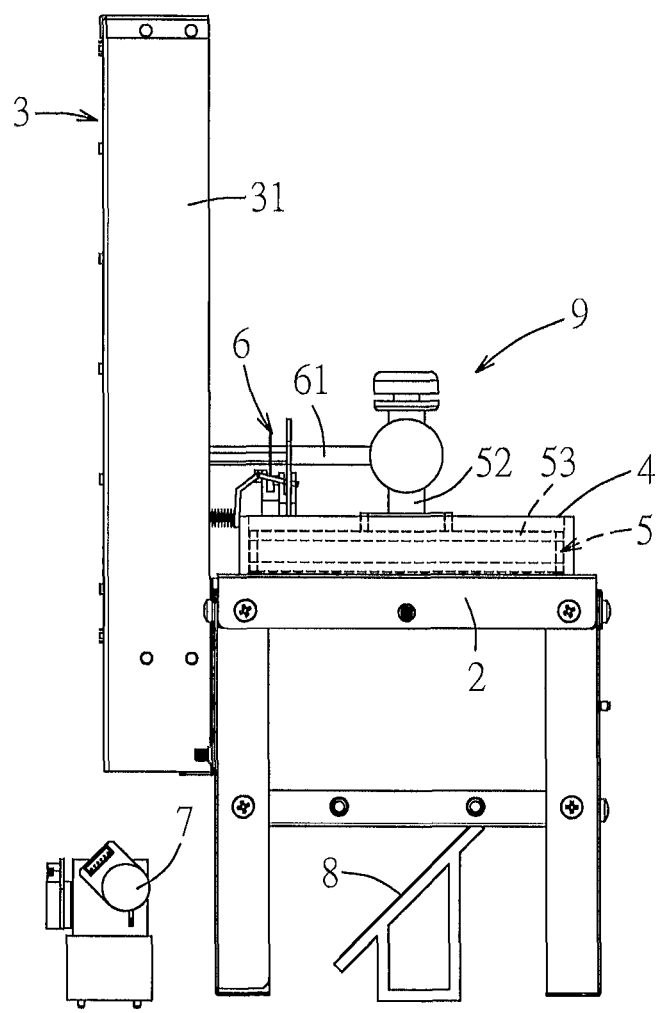
FIG. 3 is a fragmentary side view of the first embodiment with a housing being omitted for the sake of clarity.
Figure 4:
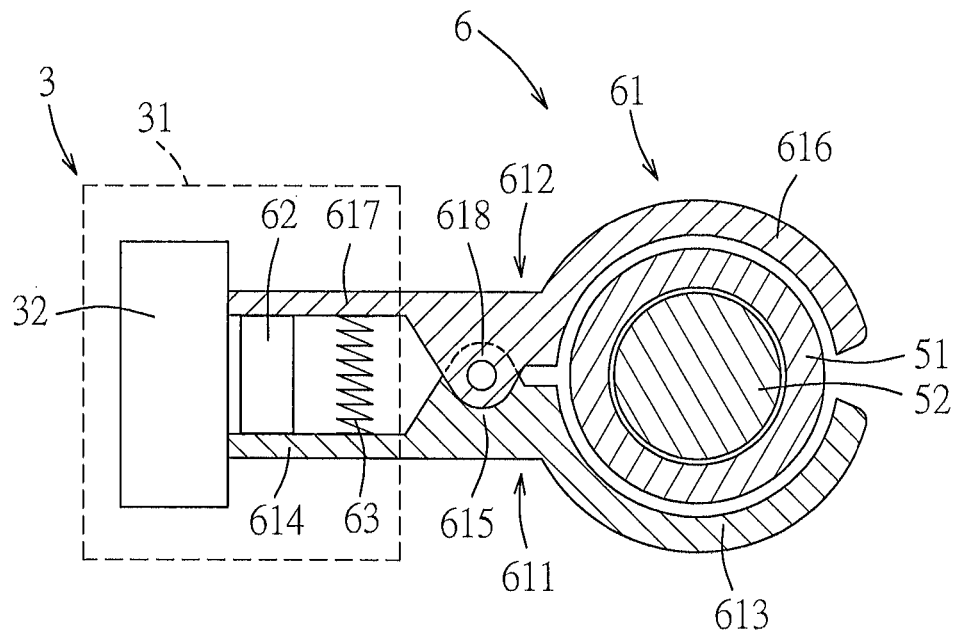
FIG. 4 is a partly sectional view of the first embodiment, illustrating first and second arm portions at a releasing state.
Figure 5:
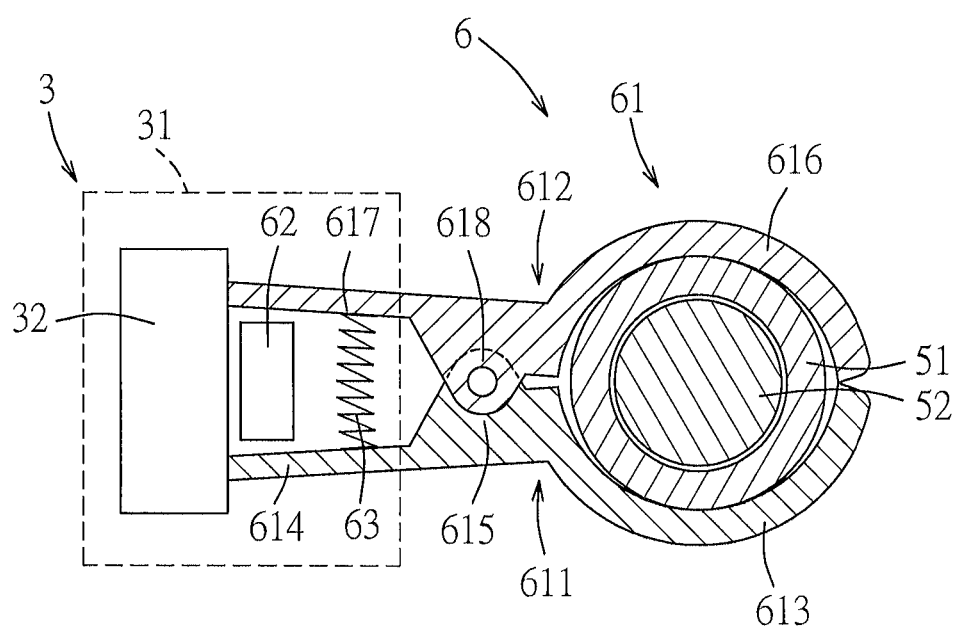
FIG. 5 is a view similar to FIG. 4, but illustrating the first and second arm portions at a locking state.

Referring further to FIGS. 3 to 5, the height adjusting mechanism 3 includes a height adjusting arm 31 and a height adjusting unit 32. The height adjusting arm 31 is connected to and extends vertically from a lateral end of the base 2. The height adjusting unit 32 is received in and slidable along the height adjusting arm 31. The forming device 9 is located above the container 4, is connected to the height adjusting unit 32, and is driven by the height adjusting unit 32 of the height adjusting mechanism 3 to move vertically along the height adjusting arm 31 relative to the container 4. The forming device 9 includes a forming mechanism 5 and a clamping mechanism 6. The forming mechanism 5 includes an universal joint 51, a forming platform 53 disposed under the universal joint 51, and a coupling shaft 52 having opposite ends that are connected respectively to the universal joint 51 and the forming platform 53.

The clamping mechanism 6 includes a clamping arm 61 interconnecting the height adjusting unit 32 of the height adjusting mechanism 3 and the universal joint 51 of the forming mechanism 5, an electromagnetic unit 62, and a resilient member 63. In this embodiment, the clamping arm 61 includes a first arm member 611 and a second arm member 612. The first arm member 611 has a first arm portion 613, a first magnetic portion 614 spaced apart from the first arm portion 613, and a first pivot portion 615 interconnecting the first arm portion 613 and the first magnetic portion 614. The second arm member 612 has a second arm portion 616, a second magnetic portion 617 spaced apart from the second arm portion 616, and a second pivot portion 618 interconnecting the second arm portion 616 and the second magnetic portion 617 and connected pivotally to the first pivot portion 615. The first magnetic portion 614 and the second magnetic portion 617 are connected to the height adjusting unit 32 of the height adjusting mechanism 3.

The electromagnetic unit 62 is disposed between the first magnetic portion 614 and the second magnetic portion 617. The resilient member 63 has opposite ends connected respectively to the first magnetic portion 614 and the second magnetic portion 617. As shown in FIG. 4, when an electric current passes through the electromagnetic unit 62, the first and second magnetic portions 614, 617 are attracted by the electromagnetic unit 62 and are drawn to move toward each other and to be attached onto the electromagnetic unit 62. Therefore, the resilient member 63 is compressed. At this time, the first and second arm portions 613, 616 are moved to a releasing state to release the universal joint 51 so that the coupling shaft 52 is pivotable via the universal joint 51 relative to the clamping mechanism 6 for adjusting orientation of the forming platform 53. When there is no electric current passing through the electromagnetic unit 62, as shown in FIG. 5, the first and second magnetic portions 614, 617 are pushed away from each other by a restoring force of the resilient member 63. Therefore, the first and second arm portions 613, 616 are moved to a locking state to tightly clamp the universal joint 51 therebetween.

In this embodiment, the electromagnetic unit 62 is an electromagnet, and the resilient member 63 is a spring. However, the electromagnetic unit 62 may be other electromagnetic components, and the resilient member 63 may be other resilient components.

During operation of the three-dimensional printing machine, an electric current is applied to the electromagnetic unit 62. Therefore, the first and second magnetic portions 614, 617 are attracted by the electromagnetic unit 62 and are drawn toward each other to compress the resilient member 63, while the first and second arm portions 613, 616 are moved to the releasing state to release the universal joint 51. The height adjusting unit 32 descends along the height adjusting arm 31, thereby driving the forming platform 53 to evenly abut against the base wall 41 of the container 4. Then, the electric current is cutoff, so that the first and second magnetic portions 614, 617 are pushed away from each other by a restoring force of the resilient member 63 to move the first and second arm portions 613, 616 to the locking state to tightly clamp the universal joint 51 therebetween. Therefore, the forming platform 53 is maintained at a position parallel to the base wall 41 of the container 4. Afterward, the laser 7 produces laser beams toward the scanner 8. The scanner 8 reflects the laser beams toward the base wall 41 for curing a portion of the light-curable liquid contained in the container 4. The height adjusting unit 32 then moves upwardly, and the forming device 9 moves along with the height adjusting unit 32 to pull up the cured light-curable liquid while the forming platform 53 is kept parallel to the base wall 41.

Figure 6:
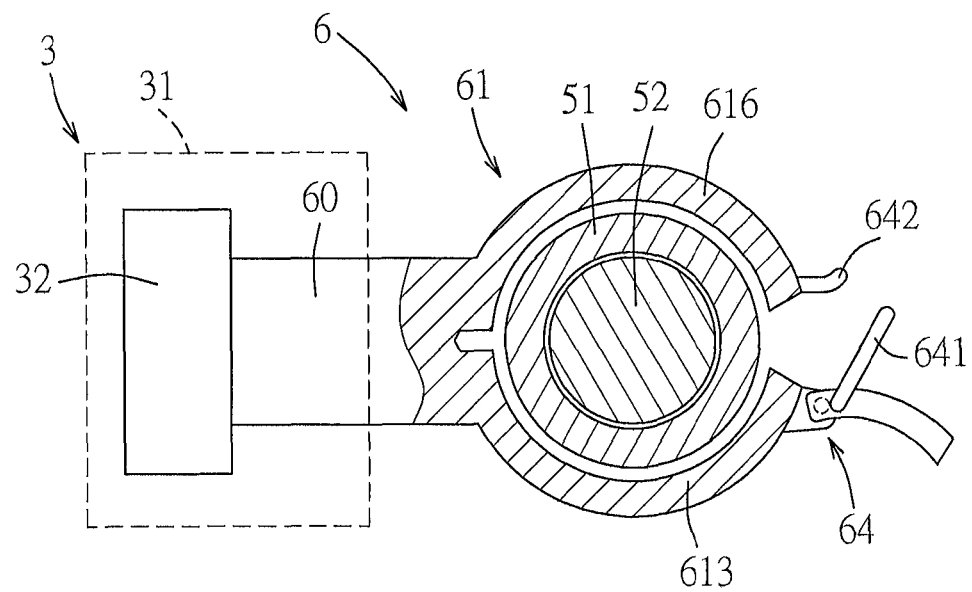
FIG. 6 is a partly sectional view of a second embodiment of the three-dimensional printing machine according to the invention, illustrating the first and second arm portions at the releasing state.
Figure 7:
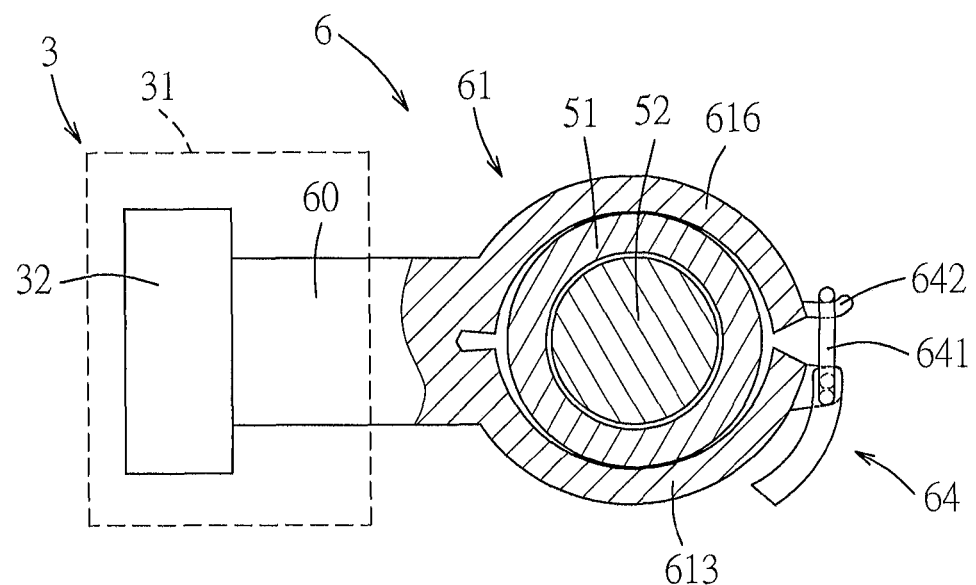
FIG. 7 is a view similar to FIG. 6, but illustrating the first and second arm portions at the locking state.

As shown in FIGS. 6 and 7, a second embodiment of the three-dimensional printing machine according to the present invention has a structure similar to that of the first embodiment. The main difference between this embodiment and the previous embodiment resides in the configuration of the clamping mechanism 6. In this embodiment, the clamping mechanism 6 includes an engaging unit 64 and a clamping arm 61, while the electromagnetic unit 62 and the resilient member 63 included in the first embodiment are omitted. The clamping arm 61 has a main portion 60 that has one end connected to the height adjusting unit 32, with the first arm portion 613 and the second arm portion 616 being connected to an opposite end of the main portion 60 and being spaced apart from and resiliently movable relative to each other. The engaging unit 64 includes a first engaging part 641 and a second engaging part 642 that are respectively connected to the first and second arm portions 613, 616. In this embodiment, the first engaging part 641 is a ring and the second engaging part 642 is an engaging block. When the first engaging part 641 is engaged with the second engaging part 642, the first and second arm portions 613, 616 are moved to the locking state (see FIG. 7) where the universal joint 51 is tightly clamped by the first and second arm portions 613, 616. When the first engaging part 641 is disengaged from the second engaging part 642, the first and second arm portions 613, 616 are moved to the releasing state (see FIG. 6) where the forming platform 53 is movable relative to the clamping mechanism 6. It should be noted that the configurations of the first and second engaging parts 641, 642 may be interchanged, i.e., the first engaging part 641 may be configured as an engaging block, while the second engaging part 642 may be configured as a ring.

With the multi-degree-of-freedom motion of the combination of the coupling shaft 52 and the universal joint 51, the forming platform 53 may seamlessly abut against the base wall 41 of the container 4. When the first and second arm portions 613, 616 are at the locking state, the forming platform 53 may be maintained to be precisely parallel to the base wall 41 of the container 4. Therefore, during curing process of the light-curable liquid, a product with precise shape and dimensions may be produced with the steady forming platform 53.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A forming device adapted for use in a three-dimensional printing machine, the three-dimensional printing machine including a height adjusting mechanism, said forming device to be connected to the height adjusting mechanism and driven by the height adjusting mechanism to move vertically, said forming device comprising:
    an universal joint;
    a forming platform;
    a coupling shaft having opposite ends that are connected respectively to said universal joint and said forming platform; and
    a clamping mechanism including a clamping arm that is adapted to interconnect the height adjusting mechanism and said universal joint, and that has first and second arm portions movable relative to each other between a locking state to tightly clamp said universal joint therebetween, and a releasing state to release said universal joint;
    wherein said clamping arm includes
        a first arm member having said first arm portion, said first arm member further having a first magnetic portion that is spaced apart from said first arm portion and that is adapted to be connected to the height adjusting mechanism, and a first pivot portion that interconnects said first arm portion and said first magnetic portion, and
        a second arm member having said second arm portion, said second arm member further having a second magnetic portion that is spaced apart from said second arm portion and that is adapted to be connected to the height adjusting mechanism, and a second pivot portion that interconnects said second arm portion and said second magnetic portion, and that is connected pivotally to said first pivot portion of said first arm member;
    wherein said clamping mechanism further includes an electromagnetic unit disposed between said first magnetic portion of said first arm member and said second magnetic portion of said second arm member, and a resilient member having opposite ends connected respectively to said first magnetic portion of said first arm member and said second magnetic portion of said second arm member;
    wherein said first and second magnetic portions are attracted by said electromagnetic unit and drawn to move toward each other when an electric current passes through said electromagnetic unit, thereby compressing said resilient member and moving said first and second arm portions to the releasing state; and
    wherein said resilient member restores to move said first and second magnetic portions away from each other when no electric current passes through said electromagnetic unit, thereby moving said first and second arm portions to the locking state.

2. A three-dimensional printing machine comprising:
    a base;
    a container mounted on said base for retaining a light-curable liquid therein;
    a height adjusting mechanism connected to a lateral end of said base;
    a forming device connected to said height adjusting mechanism, driven by said height adjusting mechanism to move vertically relative to said container, and including
        a forming mechanism that includes an universal joint, a forming platform disposed under said universal joint, and a coupling shaft having opposite ends that are connected respectively to said universal joint and said forming platform, and
        a clamping mechanism that includes a clamping arm interconnecting said height adjusting mechanism and said universal joint, and that is operable to tightly clamp said universal joint or to release said universal joint, said forming platform being movable relative to said clamping mechanism when said universal joint is released from said clamping arm;
    a laser adapted for producing laser beams; and
    a scanner adapted for reflecting the laser beams produced by said laser to the light-curable liquid;
    wherein said clamping arm includes
        a first arm member having a first arm portion, a first magnetic portion that is spaced apart from said first arm portion and that is connected to said height adjusting mechanism, and a first pivot portion that interconnects said first arm portion and said first magnetic portion, and
        a second arm member having a second arm portion, a second magnetic portion that is spaced apart from said second arm portion and that is connected to said height adjusting mechanism, and a second pivot portion that interconnects said second arm portion and said second magnetic portion, and that is connected pivotally to said first pivot portion of said first arm member;
    wherein said first and second arm portions are movable relative to each other between a locking state to tightly clamp said universal joint therebetween, and a releasing state to release said universal joint so that said forming platform is movable relative to said clamping mechanism;
    wherein said clamping mechanism further includes an electromagnetic unit disposed between said first magnetic portion of said first arm member and said second magnetic portion of said second arm member, and a resilient member having opposite ends connected respectively to said first magnetic portion of said first arm member and said second magnetic portion of said second arm member;
    wherein said first and second magnetic portions are attracted by said electromagnetic unit and drawn to move toward each other when an electric current passes through said electromagnetic unit, thereby compressing said resilient member and moving said first and second arm portions to the releasing state; and
    wherein said resilient member restores to move said first and second magnetic portions away from each other when no electric current passes through said electromagnetic unit, thereby moving said first and second arm portions to the locking state.

3. The three-dimensional printing machine as claimed in claim 2, wherein said container includes a base wall that is parallel to said forming platform when said universal joint is tightly clamped by said clamping arm and when said forming device is driven to move upwardly away from said container.

4. The three-dimensional printing machine as claimed in claim 2, further comprising a housing that includes:
  a housing body retaining said base, said height adjusting mechanism, said container, said forming device, said laser and said scanner therein, and formed with an opening; and
  a cover member openably covering said opening.

\* \* \* \* \*